US012762383B2

(12) United States Patent
Qiao et al.

(10) Patent No.: US 12,762,383 B2
(45) Date of Patent: Oct. 13, 2026

(54) COMPUTING DEVICE AND ELECTRONIC DEVICE

(71) Applicant: Chengdu SynSense Technology Co., Ltd., Chengdu (CN)

(72) Inventors: Ning Qiao, Chengdu (CN); Sadique UlAmeen Sheik, Schlieren (CH); Xin Bai, Chengdu (CN); Philipp Weidel, Zürich (CH)

( * ) Notice: Subject to any disclaimer, the term of this patent is extended or adjusted under 35 U.S.C. 154(b) by 714 days.

(21) Appl. No.: 18/253,762

(22) PCT Filed: Sep. 22, 2021

(86) PCT No.: PCT/CN2021/119625

§ 371 (c)(1),
(2) Date: May 19, 2023

(87) PCT Pub. No.: WO2023/010663

PCT Pub. Date: Feb. 9, 2023

(65) Prior Publication Data

US 2024/0013036 A1 Jan. 11, 2024

(30) Foreign Application Priority Data

Aug. 2, 2021 (CN) ........................ 202110879189.6

(51) Int. Cl.
*G06F 16/00* (2019.01)
*G06N 3/049* (2023.01)
*G06N 3/065* (2023.01)

(52) U.S. Cl.
CPC ............. *G06N 3/049* (2013.01); *G06N 3/065* (2023.01)

(58) Field of Classification Search
CPC ........ G06N 3/049; G06N 3/065; G06N 3/084; G06N 3/048; G06N 3/0464; G06N 3/063; G06N 3/045; G10L 13/047
See application file for complete search history.

(56) References Cited

U.S. PATENT DOCUMENTS 10,586,531 B2 3/2020 Van Den Oord et al.
11,150,327 B1 * 10/2021 Jiang ........................ G01S 7/417
(Continued)

FOREIGN PATENT DOCUMENTS

CN 102831476 A 12/2012
CN 105095967 A 11/2015
(Continued)

OTHER PUBLICATIONS

International Search Report in International application No. PCT/CN2021/119625, mailed on Apr. 29, 2022.
Written Opinion of the International Search Authority in International application No. PCT/CN2021/119625, mailed on Apr. 29, 2022.

(Continued)

*Primary Examiner* — Noosha Arjomandi
(74) *Attorney, Agent, or Firm* — Michael D. Eisenberg; MDE Patents

(57) ABSTRACT

A computing device includes computing modules, each of which comprises a plurality of neuron populations. The computing module is configured to project the input spike train which is weighted by a first weight matrix to a first neuron population through a multi-synapse projection. The multi-synapse projection has at least two different and positive synaptic time constants, or at least two different synaptic transmission delays. In order to realize time-domain convolution in a spiking neural network with low hardware resource consumption, a multi-synaptic projection technology means with different synaptic time constants is proposed. On this basis, a waveform-aware spike neural network for time-domain signal processing characterized by residual connections and skip connections is further proposed. Through these technical means, the performance gap between SNN and ANN is bridged, and SNN with performance reaching or close to ANN is obtained.

20 Claims, 4 Drawing Sheets

(56) References Cited

U.S. PATENT DOCUMENTS

| | | | | |
|---|---|---|---|---|
| 2013/0073501 | A1 | 3/2013 | Hunzinger et al. | |
| 2013/0318020 | A1 * | 11/2013 | Shapero | G06N 3/044 706/30 |
| 2014/0330761 | A1 * | 11/2014 | Kim | G06N 3/063 706/25 |
| 2018/0174023 | A1 * | 6/2018 | Imam | G06N 3/049 |
| 2018/0174041 | A1 * | 6/2018 | Imam | G06N 3/063 |
| 2019/0057308 | A1 | 2/2019 | Cho et al. | |
| 2019/0279079 | A1 | 9/2019 | Sim et al. | |
| 2020/0019839 | A1 * | 1/2020 | Boahen | G06N 3/0499 |
| 2020/0160164 | A1 * | 5/2020 | Kim | G06N 3/063 |
| 2020/0204412 | A1 * | 6/2020 | Fompeyrine | H04L 27/001 |
| 2020/0401876 | A1 * | 12/2020 | Chakrabartty | G06N 3/08 |
| 2021/0125048 | A1 * | 4/2021 | Jang | G11C 13/0007 |
| 2021/0342677 | A1 * | 11/2021 | Dalli | G06N 3/092 |
| 2022/0188597 | A1 * | 6/2022 | Richter | G06N 3/049 |
| 2023/0214925 | A1 * | 7/2023 | Cella | G06Q 30/06 705/37 |
| 2023/0409890 | A1 * | 12/2023 | Pan | G06N 3/065 |
| 2024/0013036 | A1 * | 1/2024 | Qiao | G06N 3/084 |
| 2026/0007805 | A1 * | 1/2026 | Mohamed | A61L 27/3804 |

FOREIGN PATENT DOCUMENTS

| | | | | |
|---|---|---|---|---|
| CN | 105122278 | A | 12/2015 | |
| CN | 107092959 | A | 8/2017 | |
| CN | 108710770 | A | 10/2018 | |
| CN | 109165731 | A | 1/2019 | |
| CN | 109804384 | A | 5/2019 | |
| CN | 109844773 | A | 6/2019 | |
| CN | 110121722 | A | 8/2019 | |
| CN | 110909869 | A | 3/2020 | |
| CN | 110998611 | A | 4/2020 | |
| CN | 111149115 | A | 5/2020 | |
| CN | 111967586 | A | 11/2020 | |
| CN | 112270407 | A | 1/2021 | |
| CN | 113313240 | A | 8/2021 | |
| WO | 2020196066 | A1 | 10/2020 | |
| WO | 2020257168 | A1 | 12/2020 | |
| WO | WO-2023010663 | A1 * | 2/2023 | G06N 3/045 |

OTHER PUBLICATIONS

The First Office Action and Search Report Dated Sep. 6, 2021, for Chengdu SynSense Technology Co., Ltd., from China Application No. 202110879189.6 and Its Translation of Office Action Into English (7 pages).

The Notice of Allowance and Search Report Dated Sep. 15, 2021, for Chengdu SynSense Technology Co., Ltd. from China Application No. 202110879189.6 and Its Translation Into English (4 pages).

Xin-wei Zhang, Abstract of “Research and Design of Brain-like Computing Accelerator Based on FPGA”, Jan. 15, 2021.

Qiu Yang, Abstract of “The Joint Regulation of Excitatory and Inhibitory STDP Plasticity to the Cortical Neural Circuits”, Jan. 15, 2020.

Aaron van den Oord, et. al, “Wavenet: A generative model for raw audio”, arXiv, Sep. 19, 2016.

Chetan Singh Thakur, et. al, “Large-Scale Neuromorphic Spiking Array Processors A quest to mimic the brain ”, arXiv, May 23, 2018.

Michiel D’Haene, et. al, “Accelerating Event Based Simulation for Multi-synapse Spiking Neural Networks”, Artificial Neural Networks—ICANN 2006 , Sep. 30, 2006.

Krizhevsky A, sutskever I, hinton G E. Imagenet classification with deep convolutional neural networks[J]. Advances in neural information processing systems, 2012, 25: 1097-1105.

Blouw P, choo X, hunsberger E, et al. Benchmarking keyword spotting efficiency on neuromorphic hardware[C]// Proceedings of the 7th Annual Neuro-inspired Computational Elements Workshop. 2019: 1-8.

Coucke A, chlieh M, gisselbrecht T, et al. Efficient keyword spotting using dilated convolutions and gating[C]//ICASSP 2019-2019 IEEE International Conference on Acoustics, speech and Signal Processing (ICASSP). IEEE, 2019: 6351-6355.

Cramer B, stradmann Y, schemmel J, et al. The Heidelberg Spiking Data Sets for the Systematic Evaluation of Spiking Neural Networks[J]. IEEE Transactions on Neural Networks and Learning Systems, 2020.

Perez-Nieves N, leung V C H, dragotti P L, et al. Neural heterogeneity promotes robust learning[J]. bioRxiv, 2021: Dec. 2020. 18.423468 (in two parts).

* cited by examiner

COMPUTING DEVICE AND ELECTRONIC DEVICE

CROSS REFERENCE TO RELATED APPLICATION

This application is a US national phase application based upon an International Application No. PCT/CN2021/119625, filed on Sep. 22, 2021, which claims the priority of Chinese Patent Application No. 202110879189.6, entitled "COMPUTING DEVICE AND ELECTRONIC DEVICE", filed on Aug. 2, 2021, the disclosure of which is incorporated herein by reference in its entirety.

FIELD OF THE DISCLOSURE

The present disclosure relates to a computing device and an electronic device, in particular to a training device, a chip and an electronic device configured with a spiking neural network (SNN) or an artificial neural network (ANN).

BACKGROUND

The traditional artificial neural network (Artificial Neural Network, ANN) belongs to the second-generation neural network, and the deep convolutional neural network (prior art 1) as its representative has led the development of artificial intelligence in the past ten years.

Related art 1: Krizhevsky A, sutskever I, hinton G E. Imagenet classification with deep convolutional neural networks[J]. Advances in neural information processing systems, 2012, 25: 1097-1105.

The second-generation neural network generally pursues accuracy as the primary goal (high performance model), so it usually has the characteristics of high energy consumption and high storage space consumption and is often used in servers and terminals with strong computing power. In recent years, a large number of ANN algorithms have emerged, such as various convolutional neural networks CNN, long short-term memory networks LSTM, etc., and the application fields are mainly computer vision, natural language processing, etc. There is a strong correlation between the parameter size of the ANN model and the classification accuracy. Its configuration parameters are often in hundreds of millions and show a growing trend, which poses a high challenge to training speed and training devices. For example, Google's BERT model of has 300 hundred million training parameters; nVIDIA's Megatron-LM project has 8.3 billion parameters, occupies 33 GB of disk, and takes 9.2 days to train using the V100 GPU.

For example, WaveNet technology is an ANN technology developed by Google's DeepMind company for speech signal synthesis, which uses hole causal convolution (also known as dilated causal convolution) and autoregressive characteristics, which can be used in the fields of multi-talker speech generation, text-to-speech TT, music generation and speech recognition. More details could be referred to prior art 2.

Related art 2: Oord A, dieleman S, zen H, et al. Wavenet: A generative model for raw audio[J]. arXiv preprint arXiv: 1609.03499, 2016.

From the perspective of speech recognition, WaveNet has achieved a test performance of 18.8 PER on the TIMIT dataset, which is the best known result as of the completion of the paper. For details on the specific application of this technology to speech recognition, reference may be made to prior art 3, and this disclosure is incorporated into the present disclosure by reference.

Related art 3: U.S. Ser. No. 10/586,531B2.

However, from a biological point of view, ANN is imprecise. It lacks the dynamic mechanism inside the nerve and cannot accurately simulate the operation mechanism of the biological brain. Originating from brain science, Spiking Neural Networks (SNN) is the third-generation neural network, aiming at artificial general intelligence. Its event-driven ultra-low power consumption feature is very suitable for edge computing, internet of Things (IoT) and other terminal scenarios.

At the biological level, neurons are one of the structural and functional units of the nervous system. Neurons can perceive changes in the environment, transmit information to other neurons, and instruct the collective to respond. The basic structure of biological neurons consists of dendrites, axons, myelin sheaths, and nucleus. The transmission forms an electric current, and its tail is a receptor, which is conducted by chemical substances (neurotransmitters), such as dopamine, acetylcholine, and current conduction is formed between two synapses after an appropriate amount of chemical substances are transmitted.

The neurons in the spiking neural network are a kind of simulation of biological neurons. Compared with the traditional neural network, the spiking neural network and its neurons simulate the operational mechanism of biological neurons more accurately. Benefiting from the sparsity of neuronal activities, the chip based on the spiking neural network will have a lower power consumption. Because it is inspired by biological neurons, some concepts related to biological neurons, such as synapse, membrane voltage, postsynaptic current, postsynaptic potential, etc., the same terms are also used when referring to the neuronal correlating concepts. Unless there are some other specific indications, the concepts at the biological level such as those mentioned in the present disclosure refer to the corresponding concepts in the spiking neural network rather than the concepts at the actual biological cell level.

Like traditional ANN, SNN also needs to build a model and also have a large number of network configuration parameters (such as synaptic weights, time constants, etc.). And then, the training data set is used to train the SNN in the device (such as high-performance graphics processor GPU device) to obtain the network configuration parameters that optimizes the SNN prediction performance. The purpose of training is: for a given sample (a training set and/or a test set), the SNN is expected to output results that match the input samples. For example, a picture of an apple is inputted to SNN. In this case, SNN is expected to output the conclusion of Apple. If SNN outputs the wrong conclusion during training, then the network will be punished. In order to calibrate the penalty, SNN will define a loss or cost function. The greater the difference between the network output and the expected result, the greater the loss function value, and vice versa. In short, the above training process is to search for a set of network configuration parameters, so that for the training set, the total or average loss function value reaches or is close to the minimum. The goal of training is to obtain the optimal network configuration parameters. Based on the optimal network configuration parameters, the SNN can output the best network prediction result for any given input.

Then it comes to the actual implementation phase of the network configuration parameters. The above optimal network configuration parameters are mapped to the brain-like chip through special tools, such as Intel's Loihi, IBM's TrueNorth, and SynSense's Dynap-CNN brain-like chips. In these brain-like chips, circuits that simulate neurons and circuits that simulate synapses are designed. These "biological" concepts in the hardware field such as the chips, according to the conventions in the field, all refer to the corresponding analog circuits. The chips deployed with the above network configuration parameters can perform an inference according to the actual input signal (a sound signal or an image signal) and output the inference result when appropriate. Since the network configuration parameters are obtained through the training device, the chips deployed with the network configuration parameters can also obtain or approach the network performance in the training phase.

SNN is very suitable for lightweight computing scenarios due to its spike sparsity. However, because of its lightweight characteristics, such as differences in accuracy and hardware resource consumption, there is still a large gap between SNN and ANN in terms of accuracy. Since there is still an accuracy gap between SNN and ANN, this is a problem that this industry wants to solve but has not been solved.

"Temporal convolution" is a common basic information processing method in neural networks, such as the aforementioned WaveNet. It could be easily implemented in ANN relying on Von Neumann architecture hardware. However, it's not easy for SNN if it needs to be implemented in a low cost. One of the objectives of the present disclosure is to propose a new method for implementing the temporal convolution in SNN, which can significantly reduce the hardware resource consumption of the chip. Based on the unique temporal convolution implementation method, the present disclosure further discloses a brand new SNN, which can bridge or reduce the gap between SNN and ANN. The high-accuracy SNN, which we call Wave-Sense SNN, outperforms the conventional SNN by a wide margin. Its performance is at or close to that of ANN. Based on the unique temporal convolution implementation, the present disclosure further discloses a brand-new ANN, which can significantly improve the space utilization of storage space compared with other ANNs (such as WaveNet).

SUMMARY OF THE DISCLOSURE

One objective of an embodiment of the present disclosure is to provide a computing device and an electronic device to reduce the temporal convolution in implementing SNN and/or to raise the accuracy of SNN with low hardware resource consumption, bridge or reduce the performance gap between SNN and ANN, and/or improve the utilization rate of storage space in the neural network.

According to a first aspect of the present disclosure, a computing device configured is disclosed. The computing device comprises a plurality of computing blocks. Each of the plurality of computing blocks comprises a plurality of neuron populations, and each of the computing blocks receives an input spike train. At least one of the computing blocks is configured to:

project the input spike train which is weighted by a first weight matrix (203) to a first neuron population (204) through a multi-synapse projection, wherein the multi-synapse projection comprises:

(i) at least two different synaptic time constants, and the two different synaptic time constants are both positive values; or (ii) at least two different synaptic transmission delays; or (iii) at least one positive synaptic time constant and at least one synaptic transmission delay with unequal delay durations;

project a spike train outputted by the first neuron population (204), which is weighted by a second weight matrix (205), to a second neuron population (206);

project the spike train outputted by the first neuron population (204), which is weighted by a third weight matrix (207), to a third neuron population (208);

add the input spike train of the computing block and an output spike train of the second neuron population (206) to obtain an output spike train of the computing block, and using the output spike train of the computing block as a corresponding input spike train of a next computing block; and sum spike trains outputted by peer neurons in the third neuron population (208) of the plurality of computing blocks to obtain a first spike train.

In some embodiments, the computing device is configured with a spiking neural network. The spiking neural network is configured with a plurality of computing blocks.

In some embodiments, the computing block is further configured to project the first spike train weighted by a fourth weight matrix (209) to a fourth neuron population (210).

In some embodiments, the computing blocks is further configured to project a spike train outputted by the fourth neuron population (210), which is weighted by a fifth weight matrix (211), to a fifth neuron population (212). The fifth neuron population (212) is a non-spiking neuron population.

In some embodiments, the computing block is further configured to project a second spike train or an injected current signal, which is weighted by a sixth weight matrix (201), to a sixth neuron population (202). A spike train outputted by the sixth neuron population (202) is an input spike train of a first computing block (11).

In some embodiments, the sixth neuron population (202) changes a dimension of the second spike train or the injected current signal, so that a dimension of the spike train outputted by the sixth neuron population (202) matches a dimension of the first computing block (11).

In some embodiments, at least two sets of the second weight matrix (205) and the second neuron population (206); and/or at least two sets of the third weight matrix (207) and the third neuron population (208); and/or at least two sets of the fourth weight matrix (209) and the fourth neuron population (210).

In some embodiments, the computing blocks is further configured to:

project the spike train outputted by the first neuron population (204), which is weighted by the second weight matrix (205), to the second neuron population (206) through a single synapse; and/or project the spike train outputted by the first neuron population (204), which is weighted by the third weight matrix (207), to the third neuron population (208) through a single synapse; and/or project the first spike train weighted by the fourth weight matrix (209) to the fourth neuron population (210) through a single synapse; and project the spike train outputted by the fourth neuron population (210), which is weighted by the fifth weight matrix (211), to the fifth neuron population (212) through a single synapse, wherein the fifth neuron population (212) is a non-spiking neuron population.

In some embodiments, the second spike train or the injected current signal is obtained after processing the ambient signal collected by a sensor.

In some embodiments, the ambient signal is one or more of sound, light, physiological, pressure, gas, temperature, and displacement signals.

In some embodiments, the computing device is configured to process an ambient signal. A second spike train or an injection current signal is obtained after the ambient signal is processed by an analog front-end circuit.

According to a second aspect of the present disclosure, a computing device configured to process an ambient signal is provided. The computing device comprises a spiking neural network system. The computing device acquires the ambient signal and transforms the ambient signal into a second spike train or an injected current signal.

The spiking neural network comprises a plurality of neuron populations, and at least one neuron population (503) of the plurality of neuron populations is configured to project the input spike train or the injected current signal of the neuron population (503), which is weighted by a weight matrix (501), to the neuron population (503) through a multi-synapse projection. The multi-synapse projection has at least two different synaptic time constants and the two different synaptic time constants are both positive.

In some embodiments, the computing device is a neuromorphic chip or a training device.

In some embodiments, the computing device is a training device. The neuron population includes a plurality of neurons. When the membrane voltage of a neuron exceeds the threshold, multiple spikes are generated in a simulated time step, and the amplitude of the multiple spikes is determined according to a ratio of the membrane voltage to the threshold.

In some embodiments, the amplitude of the multiple spikes is equal to a unit amplitude multiplied by a rounded down value of the ratio.

In some embodiments, a total loss of a spiking neural network is a summation of a first loss and a second loss, and the first loss reflects a difference between an expected output and an actual output of the spiking neural network and the second loss reflects an activity or degree of activity of the neuron.

In some embodiments, the computing device is a neuromorphic chip; and a synaptic projection path is turned on/off by configuring a RAM and/or a register.

According to a third aspect of the present disclosure, a computing device configured to process an ambient signal is provided. The computing device comprises a plurality of computing blocks. Each of the computing blocks comprises a plurality of neuron populations, and each of the computing blocks receives a corresponding input signal. At least one of the computing blocks is configured to:

project the input spike train weighted by a first weight matrix (203) to a first neuron population (204) through a multi-synapse projection, wherein the multi-synapse projection comprises:

(i) at least two different synaptic time constants, and the two different synaptic time constants are both positive values; or (ii) at least two different synaptic transmission delays; or (iii) at least one positive synaptic time constant and at least one synaptic transmission delay with unequal delay durations;

project a spike train outputted by the first neuron population (204), which is weighted by a second weight matrix (205), to a second neuron population (206);

project the spike train outputted by the first neuron population (204), which is weighted by a third weight matrix (207), to a third neuron population (208);

adding the input spike train of the computing block and an output spike train of the second neuron population (206) to obtain an output spike train of the computing block, and using the output spike train of the computing block as a corresponding input spike train of a next computing block; and summing spike trains outputted by peer neurons in the third neuron population (208) of the plurality of computing blocks to obtain a first signal.

In some embodiments, the computing device is configured with an artificial neural network. The artificial neural network is configured to process ambient signals.

In some embodiments, the computing device is configured to project the first signal weighted by the fourth weight matrix (209) to the fourth neuron population (210).

In some embodiments, the computing device is configured to project the output signal of the fourth neuron population (210) weighted by the fifth weight matrix (211) to the fifth neuron population (212). The fifth neuron population (212) is a low-pass neuron population.

In some embodiments, the computing device acquires an ambient signal and transforms the ambient signal into a second signal. The computing device is configured to project the second signal weighted by a sixth weight matrix (201) to the sixth neuron population (202). The signal output by the sixth neuron population (202) is the input signal of the first computing block (11).

In some embodiments, an activation function of neurons in the neuron population is a linear activation function or a nonlinear activation function.

In some embodiments, the nonlinear activation function belongs to one of the following functions: ReLU, Sigmoid, Tan h, LReLU, PReLU, Softmax, Swish, ELU, SELu, Srelu, LeCun Tan h, Arc Tan h, SoftPlus functions.

In some embodiments, the computing device is a CPU, GPU, NPU, TPU, microprocessor or training device.

According to a fourth aspect of the present disclosure, an electronic device comprising any computing device as provided above. The computing device is a chip.

In contrast to the conventional art, different embodiments of the present disclosure could have one or more of the following advantages:

1. Receive spike streams without temporarily "catch frames". The conventional "batch mode" first records data for a period of time, converts the data into a vector, and passes all the data to the neural network at the same time. In this case, a normal forward convolution does the work of the temporal convolution. The present disclosure is a "steaming mode", where the input data is processed as it arrives without buffering or framing, which avoids redundant computation and storage consumption because this solution does not require storage of the past Input data. In the stream model, there is no need to store the raw signal, and the signal can be sent to the network when it arrives, which will greatly reduce the delay of signal processing. Both WaveNet and Wave-Sense do this, but WaveNet still needs to store an intermediate state of the signal in a buffer. Wave-Sense does not need to do so and this is the advantage of Wave-Sense.

2. No delay is required in the connection. Temporal convolution requires past information. This is often implemented by storing past data. In ANN implementation, the data are stored in the buffer. In SNN, a delay line could be used to store the spikes, which is the so-called synaptic delay. However, this delay enormously consumes hardware resources, such as the storage space and computing resources. The present disclosure uses multi-synaptic connections with different time constants in the two layers or populations, (e.g.: one fast and one slow if there are only two). It is fundamentally equivalent to perform weighted temporal convolution and avoid the resource consumption.

3. Use a very simple Leaky Integrate-and-Fire (LIF) spiking neuron model without any redundant self-adaptation mechanisms.

4. A recurrent connection is not required. Generally, the recurrent connection is difficult to be trained or tuned. A feed-forward connection makes it easy to design the network according to the task requirements. This avoids the challenge of balancing weights and activities that often occurs in the conventional recurrent architecture solutions.

5. Minimal resource consumption and demand. A typical SNN scheme often uses a single synaptic connection between two neurons. Even if two different synapses are used to connect neurons, one uses a positive weight value and the other uses a negative weight value. However, in the present disclosure, the multi-synapse connections between neurons have different time constants. This approach does not require additional restrictions on their weight values.

All connections to a neuron with the same synaptic time constant can share the same state variable or the same storage space and do not require distinct states. Because of this, this solution (whether it is a Wave-Sense SNN or the corresponding ANN) has a space requirement in a proportion of $\mathcal{O}(N)$ to the number of neurons N, which greatly reduces the storage requirement compared with the required proportion of $\mathcal{O}(N^2)$ in the conventional art.

6. Achieve or near-achieve the task performance of ANN, which is a technical goal generally pursued in this field.

The above-mentioned techniques, technical features, and technical means might not be completely the same as those in parts of the following embodiments. However, these techniques also fall within the scope of the present disclosure. These techniques, technical features, and technical means and those disclosed in the following embodiments could be reasonably combined to accomplish more techniques, which could be regarded as beneficial supplements of the embodiments. Similarly, some details in the figures in this disclosure might not be illustrated in detail. But if one of ordinary skills in the art could infer the techniques from the related disclosure, corresponding descriptions, common knowledge in this field, or other conventional techniques (such as conferences or papers), then these details also fall within the scope of the present disclosure. In addition, these details could be also used to combine with other techniques to obtain new techniques. The techniques generated by combining technical features disclosed in the present disclosure could be used to support the summary of the techniques, the amendments, the claims or the disclosure of this patent application.

DETAILED DESCRIPTION

The terms "first" and "second" are used to identify or distinguish two components, but are not used to limit the number of the components. Although it is often used to point to one component but this does not mean that the number of the component should be limited to one. For example, only one component is shown because of equivalent alternative, better performance, or pressure sharing.

The term "spike" mentioned in the present disclosure all refer to spikes in the neuroscience field. The training algorithm can be written into a computer program in the form of computer codes, stored in a storage medium, and read by a processor of a computer (such as a GPU device with high-performance graphics processor, a field programmable gate arrays FPGA, an application-specific integrated circuits ASIC, etc.) Such data sets). Under the training of the training algorithms, neural network configuration parameters that can be deployed into simulated neuromorphic devices (such as the brain-like chip) could be obtained. The neuro-device configured with the parameters will obtain the reasoning ability. According to the input signal of the sensor (such as a dynamic vision camera DVS that perceives light and shade changes, a special voice signal acquisition equipment, etc.), the neuro-device will reason about it and output inference results through the wires, wireless communication modules, etc. to other external processing modules (such as a single chip machine, etc.). Other technical solutions and details that are not disclosed in detail generally belong to conventional technical means/common knowledge in this field, and thus will not be described in detail in the following disclosure for simplicity.

The "/" anywhere in the present disclosure indicates a logical "or", unless it is the meaning of division. The terms "first", "second", "third" and the like in any position of the present disclosure are only used for distinguishing marks in description, and do not imply an absolute order in time or space, nor does it imply that the term with such serial number and the same term with other determiners are necessarily different references. The various modules, neurons, synapses described in the present disclosure may be implemented by software, hardware (such as circuits) or a combination of software and hardware, and the specific embodiments are not limited.

Figure 1:
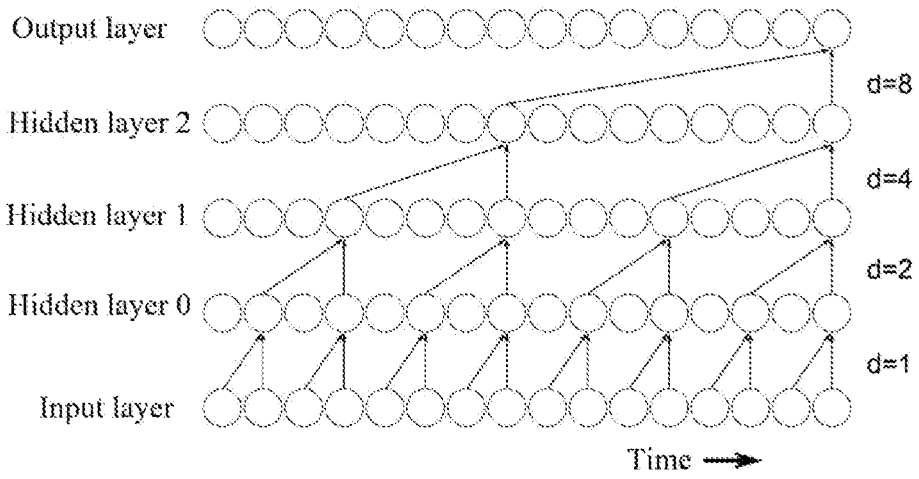
FIG. 1 is a schematic diagram of a hole causal convolution according to the conventional art.

Please refer to FIG. 1. FIG. 1 is a schematic diagram of a hole causal convolution of WaveNet according to the conventional art. The input layer contains multiple neurons. As shown in FIG. 1, 16 input neurons are depicted. After convolution with a 1*2 convolution kernel, it is passed to the next layer, the hidden layer 0. Then the 8 neurons in the hidden layer 0 are passed to the next layer after hole convolution. This process continues until the result is passed to the output layer. Since there are a plurality of neurons in the hidden layer that do not participate in the convolution operation, holes are formed. For the input layer, the corresponding expansion coefficient is 1, the expansion coefficient of the hidden layer 0 is 2, the expansion coefficient of hidden layer 1 is 4, and the expansion coefficient of hidden layer 2 is 8. In other words, these convolution operations perform weighted information accumulation operations at different time points. In addition, for ANNs, this technique could be implemented through previously storing activations. It can be seen that compared with conventional causal convolutions, this technique has a larger receptive field (or a time window, a sampling length), but uses fewer parameters and requires less computation.

However, for SNN, it cannot implement the hole causal convolution through storing the previous activations. The inventor independently found that through other changes or operations, similar effects of implementations can also be achieved. Specifically, the inventors discovered that the dynamics of neurons and synapses can be used as a proxy for temporal convolution processing.

Wave-Sense SNN: according to certain embodiments of the present disclosure, a computing device (e.g., a training device or a chip, etc.) is disclosed. The computing device is configured with a spiking neural network and is used to process an ambient signal or a time domain signal. The computing device acquires ambient signals, including but not limited to voice signals. The acquisition of the ambient signals, for example, may be acquired by a voice signal acquisition device (chip), or by reading the stored voice signal data (training device). The specific acquisition method may be one or more any well-known methods in the art.

Optionally, after the ambient signal is pre-processed, it is transformed into a second spike train. The spike neural network system receives the second pulse train and performs a corresponding response to output an inference result. The inference result, in some embodiments, can be a classification result or the possibility that the input ambient signal belongs to certain classes. The preprocessing can be a technical means well known in the art. In some embodiments, the spiking neural network or the computing device is configured to perform Key Words Spotting (KWS) in the user's voice.

The spike train is a form of signal in the neuroscience field. Information can generally be encoded in the time sequence of the spike train. Normally, it has the same duration and unit amplitude, but this is not a limitation of the present disclosure. In the actual implementation, the information could be encoded in the variable "spike-train" mechanism, which will be illustrated in the following disclosure.

For a computing device such as a chip, the preprocessing can be executed sequentially through a low noise amplifier (LNA), an analog feature extraction circuit, and an event-driven analog-to-digital conversion (ED-ADC), where the analog feature extraction circuit may further include a bandpass filter (BPF), and a full-wave rectifier (FWR), and the ED-ADC can be an integrate and fire (IAF) encoder.

For a computing device such as a training device, the preprocessing may include some or all of the following steps: a noise enhancement, a pre-amplification, a bandpass filtering, a full-wave rectification, a spike conversion and a combining operation. The training device can be an ordinary computer, a server, a training device dedicated for machine learning (such as a computing device including a high-performance graphics processor GPU), a high-performance computer, or a field programmable gate arrays (FPGA), an application-specific integrated circuits (ASIC), and the like.

The spiking neural network may include a plurality of neuron populations (also known as neuron clusters, neuron layers, or layers), and each neuron population includes a plurality of neurons, and the neurons can be connected (physically or logically) by synapses. That is, one neuron can be projected to another neuron through synapses.

Figure 2:
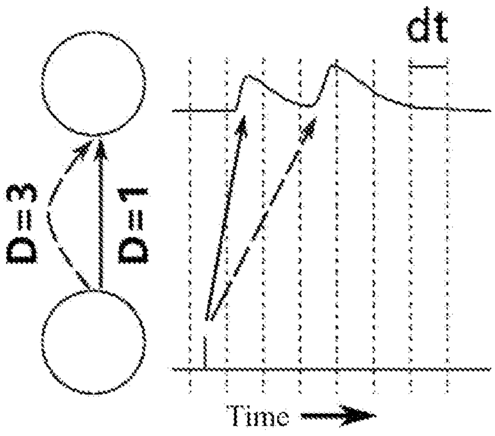
FIG. 2 is a diagram of the excitatory postsynaptic voltage level corresponding to different synaptic transmission delays.
Figure 3:
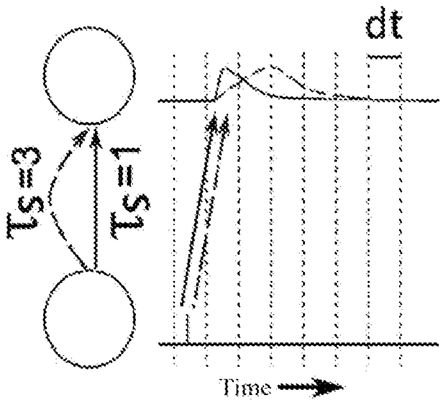
FIG. 3 is a diagram of the excitatory postsynaptic voltage level corresponding to different synaptic time constants.

Please refer to FIG. 2 and FIG. 3. These two figures show the effect of different technical pathways on excitatory postsynaptic potentials (Excitatory PSP). The first scenario (synaptic transmission delay scheme) is exemplarily shown in FIG. 2: where one neuron sends spikes to another neuron via two synaptic connections, but the two synaptic connections have different synaptic transmission delays. In this scenario, one channel has a synaptic connection D=1, and the other one has a synaptic connection D=3. With these two different synaptic transmission delays, the effect (convolution of the PSP nucleus with the input spike train) for each projection of nucleus size 2 is shown in the waveform in the above of FIG. 2. In some embodiments, there can be at least two synaptic connections between two neurons, such as 2, 3, 4, 5 connections or more, but these synaptic connections should have at least two synapses connections should have different synaptic transmission delays.

In a preferred embodiment, please refer to FIG. 3, which exemplarily shows the second scenario (synaptic time constant scheme): where one neuron sends spikes to another neuron through two synaptic connections, but the two synapses have different synaptic time constants $\tau s$, one of which has a synaptic time constant $\tau s=1$, and the other has a synaptic time constant $\tau s=3$. Comparing FIG. 2 with FIG. 3, quantitatively, the aforementioned synaptic transmission delay scheme and synaptic time constant scheme have different effects. But qualitatively, both have the potential to transform and project information in the time domain. In some embodiment s, there can be at least two synaptic connections between two neurons, such as 3, 4, 5 and more connections, but these synaptic connections should have at least two different synaptic connections. In general, these synaptic time constants are positive values (positive numbers, greater than 0).

It should be noted that, in general, the synaptic time constant should be set as a positive number for implement synaptic delay. However, the synaptic time constant could be set as a negative number to implement the synaptic delay. This change also falls within the scope of the present disclosure.

In some embodiments, the synaptic transmission delay scheme and the synaptic time constant scheme can be mixed. That is, some synaptic projections use the synaptic transmission delay scheme, and the other synaptic projections use the synaptic time constant scheme. Furthermore, the two schemes have different effects on the delay of signal transmission on the synapse. That is, the delay times of the two schemes are not equivalent. In the present disclosure, "synaptic transmission delay" and "synaptic time constant" are two completely different implementations. Although setting the "synaptic time constant" can be used to obtain synaptic delays, but it cannot be equated with a "synaptic transmission delay" measure in the context of the present disclosure. The synaptic transmission delay can be implemented through storing the output of a certain neuron population and then passing the output to the next neuron population after several time steps.

Compared with the synaptic transmission delay scheme, the scheme of setting different synaptic time constants has more resource advantages. The former has more prominent resource consumption on the neuro-hardware, while the latter occupies less hardware resources.

Figure 4:
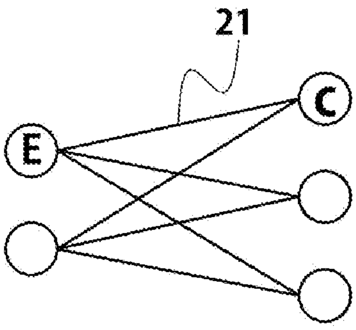
FIG. 4 is a diagram of conventional single-synapse projection of neurons.

Please refer to FIG. 4. FIG. 4 is a diagram of conventional single-synapse projection of neurons in a spiking neural network. Most neural networks are internally layered, each layer includes several neurons, and the neurons in the previous layer transmit signals to the next layer. For the neuron E in the upper layer, it is projected to the neuron C through the synapse 21. The output signal of the neuron E is transmitted to the neuron C. However, a conventional projection is only a single projection. That is, there is only a single synaptic projection between one neuron and another.

Figure 5:
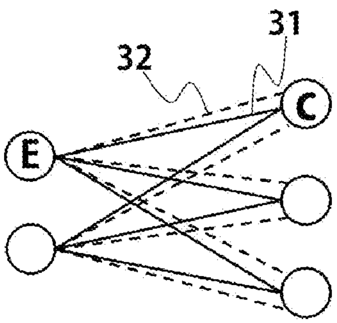
FIG. 5 is a diagram of multi-synapse projection of neurons according to an embodiment of the present disclosure.

Please refer to FIG. 5. FIG. 5 is a diagram of multi-synapse projection of neurons according to an embodiment of the present disclosure. Different from the FIG. 4 scheme, the projection proposed in the present disclosure is a multi-synapse projection method. That is, the neuron E is projected to the neuron C through at least the synaptic connection 31 and the synaptic connection 32. The "multi-synapse projection" in the present disclosure means that at least one neuron is projected to another neuron through at least two or more synapses. The other neuron can also receive the input of the spike train with other neurons through the multi-synapse projection. In addition, for the at least two synapses, it has at least two different synaptic time constants. For example, 4 synaptic projections can have 4 different synaptic time constants, 3 different synaptic time constants (meaning that two synaptic projections have the same synaptic time constant), or 2 different synaptic time constants time constants. Generally, the synaptic time constants are positive. In an embodiment, it is beneficial for the multi-synapse projections to have two or more synaptic time constants.

In a preferred embodiment, 2 synaptic projections are used between some or all neurons in the neural network, and the 2 synaptic projections have different synaptic time constants. In this case, setting the synaptic time constants to different positive numbers means that the implementation has different synaptic transmission time. Usually one channel is faster and the other is slower.

It should be noted that in the field of computational neuroscience, some neural networks have polysynaptic connections but they are only for inhibitory connections (negative weights) and excitatory connections (positive weights). This technical solution is essentially different from the temporal convolution or solving temporal tasks in the present disclosure.

Figure 6:
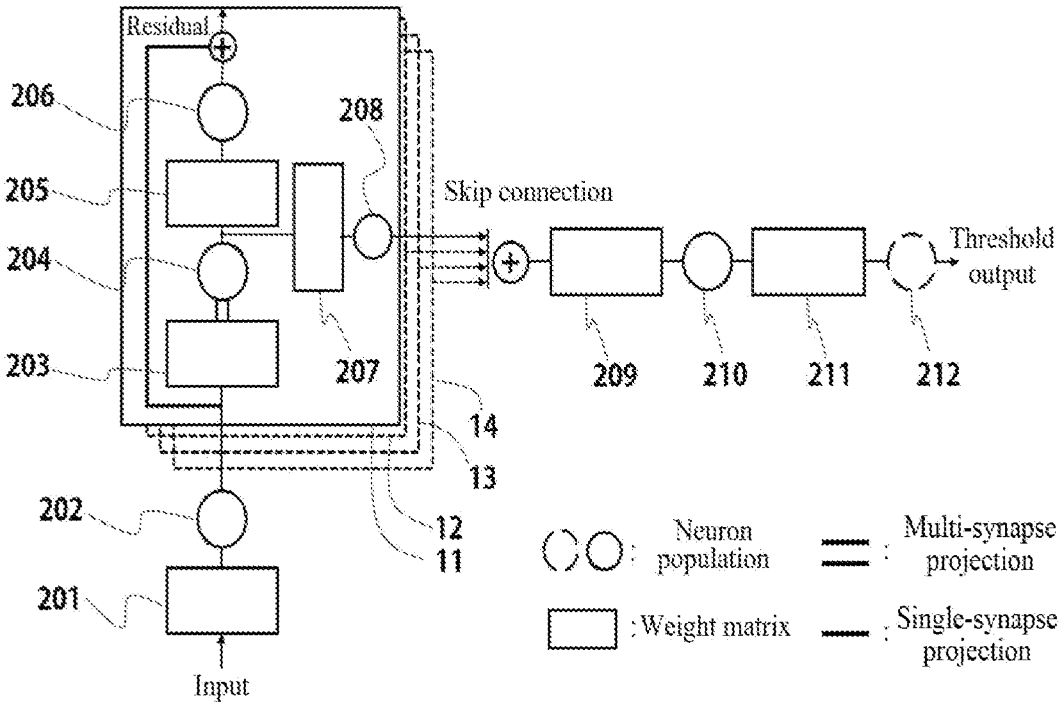
FIG. 6 is a diagram of a spike neuron network architecture according to an embodiment of the present disclosure.

Please refer to FIG. 6. FIG. 6 is a diagram of the Wave-Sense spiking neural network according to an embodiment of the present disclosure. The boxes in the figure represent the weight matrixes (and from a certain perspective, they represent full connections), and the circles in the figure represent neuron populations. The multi-connected lines (two are shown in the figure) represent multi-synapse projections, and the single-connected lines represent single-synapse projections. The network architecture includes at least two "computing blocks", four of which are schematically listed in the figure and are drawn in solid and dashed lines in the figure. They are marked as the first computing block 11, the second computing block 12, the third computing block 13, and the fourth computing block 14, each of which has the same or similar structure.

Each computing block includes at least three neuron populations: a first neuron population 204, a second neuron population 206, and a third neuron population 208. Each neuron population includes several neurons.

Preferably, in some embodiments, the network architecture further includes a fourth neuron population (also called a hidden layer) 210, a fifth neuron population (also called a non-spiking low-pass readout layer) 212, and a sixth neuron population 202.

In the following disclosure, the first computing block 11 is taken as an example to illustrate the working mechanism of the first computing block 11. The receiving end of each computing block receives an input spike train, and the input spike train may be a multi-channel spike train.

For the first neuron population 204, after being weighting by the first weight matrix 203, the input spike train is projected to the first neuron population 204 through a multi-synapse projection. For example, referring to the multi-synapse projection described above, by setting up two independent synaptic connections having different synaptic time constants or synaptic transmission delays, the input spike train is projected to the first neuron population 204 through the two synaptic connections. Illustratively, if the sixth neuron population 202 has N neurons and the first neuron population 204 has M neurons, and if there are K synaptic connections between every two neurons, then the first weight matrix 203 has a dimension of K*M*N; In the case of two synaptic projections, the first weight matrix 203 has a dimension of 2*M*N. Preferably, for the above-mentioned case of K synaptic connections, the two connected neuron populations have K or kinds of synaptic time constants. More generally, for all K*M*N synaptic connections of two connected neuron populations, each synaptic connection has its own synaptic time constant, which also enables the network to work, but the computational model of storage requirements will be a little more complicated. In general, the synaptic time constants should all be positive values to correspond to two synaptic projections with different propagation delays.

Using two synaptic connections with different time constants means combining signals at two different time points. If a plurality of synaptic connections with different synaptic time constants (or synaptic transmission delays) are used, information will be merged at more time points. This could introduce the possibilities for richer and more sophisticated information processing.

For the second neuron population 206, the spike train output by the first neuron population 204 is weighted by the second weight matrix 205 and projected to the second neuron cluster 206. The projection mechanism of neurons is known to those skilled in the art, and will be omitted here.

In FIG. 6, only one set of weight matrix and neuron population is shown. In some embodiments, there may be at least two sets of second weight matrices 205 and second neuron populations 206 that are series-connected to form a longer neuron population chain.

For the third neuron population 208, which also receives projections from the first neuron 204, the weight matrix of the projections is the third weight matrix 207. That is, the first neuron population 204 is projected to the second neuron population 206 and the third neuron population 208, respectively. The third neuron population 208 is neither projected to other populations or layers in this computing block, nor to the next computing block.

In some embodiments, there may be at least two sets of third weight matrices 207 and third neuron populations 208 that are series-connected to form a longer neuron population chain.

For the first computing block 11, its output is the sum of the output spike train of the second neuron population 206 and the input spike train (i.e., residual connection) of the first computing block 11. The output of the first computing block 11 is projected to the corresponding input terminal of the next computing block (i.e., the second computing block 12). Based on the above-mentioned similar processing mechanism, the output of the second computing block 12 is used as the input of the next computing block (i.e., the third computing block 13), and the output of the third computing block 13 is used as the input of the next computing block (i.e., the fourth computing block 14), and so on until the last computing block. The number of the computing blocks should be selected to make the sum of these synaptic time constants be proportional to the internal temporal memory according to the demands. Residual connections and summations can be implemented through synaptic connections.

For the fourth neuron population 210, it belongs to the hidden layer in the entire network. For the third neuron population 208 in each computing block, it is weighted by the fourth weighting matrix 209 to be projected to the fourth neuron cluster 210, this process is known as a skip connection because it is no longer projected to a layer or population in a compute module or the next compute module.

Specifically, for the jth (j is a positive integer and an unspecified serial number) neuron of the third neuron population 208 in each computing block, the activated spikes are summed (i.e., added). In other words, the spikes outputted by neurons with the same serial number (i.e., the same status) in all computing blocks will be summed (i.e., merged and added) to obtain the first spike train. In this way, from the external perspective of the computing block, even if there are a plurality of computing blocks, the dimension of neurons drawn from the computing blocks is consistent with the neuron dimension of the third neuron population 208.

Optionally, in some embodiments, there can be more than one set (for example, two sets) of the fourth weight matrix 209 and the fourth neuron population 210. In this case, at least two sets of weight matrices and neuron populations may be used instead of only one set shown in the figure to form a longer neuron population chain.

For the fifth neuron population 212, the output spikes of the fourth neuron cluster 210 are weighted by the fifth weight matrix 211 in the synaptic connections to obtain a threshold output. The fifth neuron population 212 is a non-spiking population, which does not generate spikes. It can be viewed as a weighted low-pass filter for the output spikes of the fifth neuron populations 212, where the neurons do not have neuronal membrane voltages or spike dynamics. If the output value of the low-pass filter exceeds the threshold, it means that the corresponding class is detected. It is equivalent to a spiking neuron's synapse and does not require any additional components, which are normally not available to spiking neurons. The advantage of setting the fifth neuron population 212 as a non-spiking neuron also includes the smooth and continuous value of its output, which is very beneficial to the fast learning of the back propagation through time (BPTT) algorithm.

For the sixth neuron population 202, it can be configured to receive the second spike train obtained after the "spike conversion and combination" described later or obtained by other means (such as IAF coding and other means). The spike train interacts with the post-synaptic potential nucleus and is weighted by the sixth weight matrix 201 to obtain the membrane voltage of the neuron. For example, the factor of the refractory nucleus can also be considered, so as to determine whether the neuron in it could send a spike. In this way, the input spike train of the first computing block 11 is obtained. That is, the second spike train is weighted by the sixth weight matrix 201 to be projected to the sixth neuron population 202. The output spike train of the sixth neuron population 202 is used as the input spike train of the first computing block 11.

It is beneficial to use the neurons in the sixth neuron population 202 to process the second spike train (or the injected current signal) before the second spike train is sent to the computing block, especially when the residual connections exist in the computing block. Another benefit of arranging the sixth neuron population 202 is that the dimensions of the second pulse train (or injected current signal) can be changed according to the actual demands. For example, the input signal has 64 channels, and only 16 channels are used in the computing block (e.g., each layer has 16 neurons), so the dimension of the second spike train (or the injected current signal) can be transformed into a dimension that matches (or be equal to) the dimension of the first computing block 11 through the sixth neuron population 202.

Alternatively, for the sixth neuron population 202, it may not receive the second spike train, but the injected current signal. For spiking neurons, the input signal can be a pulse train or an injected current signal, which is similar to the common IAF encoding mechanism.

Figure 7:
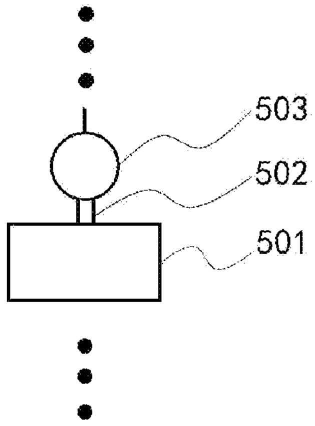
FIG. 7 is a diagram of a general structure of the neural network implementing a temporal convolution according to an embodiment of the present disclosure.

Please refer to FIG. 7. FIG. 7 is a diagram of a general structure of the neural network implementing a temporal convolution according to an embodiment of the present disclosure. In this embodiment, a computing device (such as a training device or a chip) for processing ambient signals is disclosed. The computing device comprises a spiking neural network and is used to process ambient signals or time-domain signals. Optionally, the computing device acquires an ambient signal (which can be acquired by a sensor or by reading the stored data after acquisition), and the ambient signal can be one or more of voice, light, physiology, pressure, gas, temperature, displacement signals. After the ambient signal is processed, it is converted into a second spike signal or an injected current signal.

In this network architecture, there is at least one neuron population (or spiking neuron layer) 503, where its input spike train or injected current signal is projected to the neuron population 503 through polysynapses 502 after being weighted by the weight matrix 501. The multi-synapse projections have different synaptic time constants, and generally these synaptic time constants are all positive values, thus enabling the temporal convolution in the spiking neural network. In some embodiments, these multi-synapse projections can be 2-way, 3-way, 4-way, 5-way and more. The spike train or the injected current signal inputted by the neuron population 503 can optionally be the above-mentioned second spike signal or injected current signal, or a signal transformed by the above-mentioned second spike signal or injected current signal.

In some embodiments, other neuron populations are also included in the upstream information processing flow of the above input spike train; and/or the output spike train of the neuron population 503 is projected to other neuron populations; and/or the neuron population 503 is in a certain spike train information processing cycle in the network architecture.

For an SNN, as shown in FIG. 6, designers can design various network architectures. The present disclosure is not limited to any specific network architecture, but uses the above-mentioned general structure to design more other types of spiking neural networks. Because the temporal convolution is implemented through only synaptic time constants and multi-synapse projections. In contrast to other schemes, especially synaptic transmission delay scheme, this embodiment has great advantages in the storage and computing resources.

Figure 8:
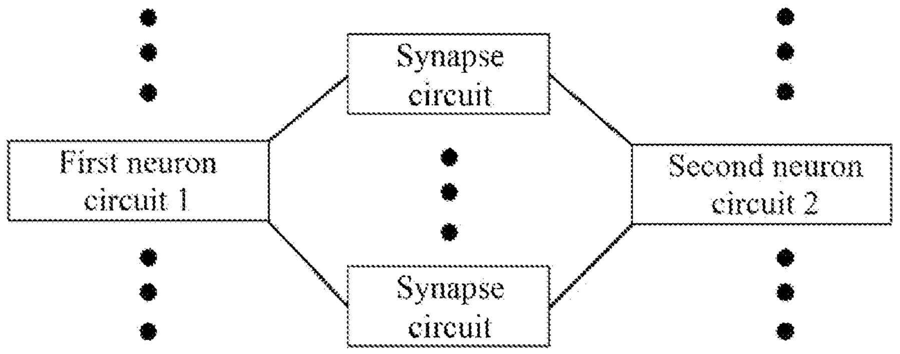
FIG. 8 is a circuit diagram inside a chip according to an embodiment of the present disclosure.

Please refer to FIG. 8. FIG. 8 is a circuit diagram inside a chip according to an embodiment of the present disclosure. For the first neuron population containing a plurality of neuron circuits. The first neuron population includes a first neuron circuit that simulates neuron 1, and the other neuron population cluster includes a second neuron circuit that simulates neuron 2. The connection between the first neuron circuit 1 and the second neuron circuit 2 is established through a plurality of (at least 2) synapse circuits. This connection can be a physical electrical connection or a logical connection.

In some embodiments, a switch function can be implemented in RAMs or/and registers for the above-mentioned multi-synapse projection function. For example, 0 means closing the synaptic connection, and 1 means opening the synaptic connection. That is, by configuring RAMs and/or registers, the synaptic projection path is turned on or off. This design could raise the flexibility and configurability in the chip design.

For training an SNN deployed in a training device: In some embodiments, the neuron model used by the SNN preferably uses the leakage-integration-discharge neuron model. The model is very simple and does not require additional self-adaptation mechanisms. In the conventional leakage-integration-discharge model, the membrane voltage is reset to the resting voltage level when it exceeds the threshold. That is, only a spike of a unit amplitude can be generated in a time step. In a preferred embodiment, the "multi-spike mechanism" can also be selected: when the membrane voltage of the neuron meets certain conditions, multiple spikes are generated in a simulated time step (multi-spike at an angle of amplitude instead of time sequence). That is, in an simulated time step, the amplitude of the spike is determined according to the ratio of the membrane voltage level to the threshold value. For example, the amplitude of the multi-spike is equal to the unit amplitude multiplied by a rounded down value (or the lower integer) of the ratio. Using the multi-pulse mechanism, the training efficiency and the neural network's performance could be raised.

In a preferred embodiment, in order to limit the activity of neurons and retain the sparse activity of neurons, for the loss function of the neural network, a second loss is also included in the total loss. The total loss is the loss after combining the first loss with the second loss. The first loss reflects the difference between the expected output of the spiking neural network and the actual output of the spiking neural network, and the second loss reflects the activity or the activity level of the neuron. The combination can be obtained by multiplying the second loss by a trimming parameter and then adding the first loss.

In a preferred embodiment, in order to solve the impulsive gradient non-derivable problem, the periodic exponential function or the Heaviside function is used as the surrogate gradient.

In the training device, the above-mentioned modules, neuron populations, synapses, etc. can be implement through software. Through the data set training, parameters such as weights can be optimized, and the value of the total loss function (that is, the total loss) is the smallest or close to minimum. By deploying these configuration parameters, the neuromorphic chip is deployed with this kind of SNN, which could perform inferences according to these configuration parameters to obtain inference results.

Wave-Sense ANN: The inventors have further discovered that the aforementioned SNN scheme utilizes spiking neurons, which are activated to fire pulse trains. However, if you do not use spiking neurons, but use conventional ANN activation methods (including but not limited to linear activation functions, nonlinear activation functions, where nonlinear activation functions include but are not limited to: ReLU, sigmoid, Tan h, LReLU, PReLU, Softmax, Swish, ELU, SELu, SRelu, LeCun Tan h, Arc Tan h, SoftPlus function), the outputs of different computing blocks are no longer spike trains, but a continuous value similar to the traditional ANN. Such a network can run on standard computing platforms (CPU, GPU, NPU, microprocessor) as well as neural network accelerators. In contrast to WaveNet, the new ANN here has a smaller storage consumption because it does not need a buffer or hole temporal convolution. Specifically, you can still refer to FIG. 6, such a Wave-Sense ANN structure is as follows:

A computing device comprising a plurality of computing blocks, each of the computing blocks comprising a plurality of neuron populations, and each of the computing blocks receiving a corresponding input signal; wherein at least one of the computing blocks is configured to:

- be weighted by a first weight matrix 203 to project the input spike train of the computing block to a first neuron population 204 through a multi-synapse projection, wherein the multi-synapse projection comprises:
- (i) at least two different synaptic time constants, and the two different synaptic time constants are both positive values; or
- (ii) at least two different synaptic transmission delays; or
- (iii) at least one positive synaptic time constant and at least one synaptic transmission delay with unequal delay durations;
- be weighted by a second weight matrix 205 to project a spike train outputted by the first neuron population 204 to a second neuron population 206;
- be weighted by a third weight matrix 207 to project the spike train outputted by the first neuron population 204 to a third neuron population 208;
- adding the input spike train of the computing block and an output spike train of the second neuron population 206 to obtain an output spike train of the computing block, and using the output spike train of the computing block as a corresponding input spike train of a next computing block; and
- summing spike trains outputted by peer neurons in the third neuron population 208 of the plurality of computing blocks to obtain a first signal.

In some embodiments, the computing device is configured with an artificial neural network (ANN) that is used to process ambient or time-domain signals.

In some embodiments, the computing device acquires an ambient signal and transforms the ambient signal into a second signal.

In some embodiments, the first signal is weighted by a fourth weight matrix 209 to be projected to a fourth neuron population 210.

In some embodiments, the output signal of the fourth neuron population 210 is weighted by a fifth weight matrix 211 to be projected to a fifth neuron population 212, which is a low pass neuron population.

In some embodiments, the second signal is weighted by the sixth weight matrix 201 to be projected to the sixth neuron population 202. The signal outputted by the sixth neuron population 202 is the input signal of the first computing block module 11.

In some embodiments, the computing device is a standard computing platform (CPU, GPU, microprocessor), an NPU, a TPU or a training device. In the training device, the above-mentioned modules, neuron populations, synapses, etc. can be implemented through software. Through the data set training, parameters such as weights can be optimized, and the value of the total loss function (i.e., the total loss) is the smallest or close to minimum. By deploying these configuration parameters, the neural network accelerator deploys this ANN and performs inference according to these configuration parameters to obtain inference results.

Figure 9:
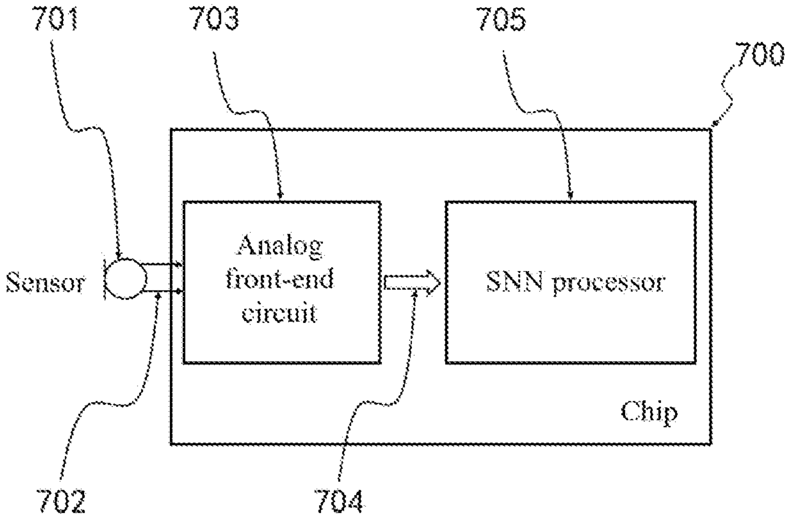
FIG. 9 is a diagram of an overall structure of a chip according to an embodiment of the present disclosure.

Please refer to FIG. 9. FIG. 9 is a diagram of the above-mentioned computing device implemented as a chip 700 according to an embodiment of the present disclosure. The sensor 701, such as a MEMS microphone, collects ambient signals (such as one or more of voice, light, physiology, pressure, gas, temperature, and displacement signals) and converts them into electrical signals 702 (which are time-domain signals or analog signals). After being processed by the analog front-end circuit 703, a spike train or an injected current signal 704 is outputted. In an embodiment, the spike train or the injected current may be an Address-Event Representation (AER). Alternatively, in some embodiments, the analog front-end circuit 703 is implemented to output the injected current signal (the aforementioned sixth neuron population 202 may also receive the injected current signal). The analog front-end circuit 703 can perform be any suitable processing operations, such as low-noise amplification, full-wave rectification, IAF encoding, etc. on the output signal of the sensor 701. These changes fall within the scope of the present disclosure.

Figure 10:
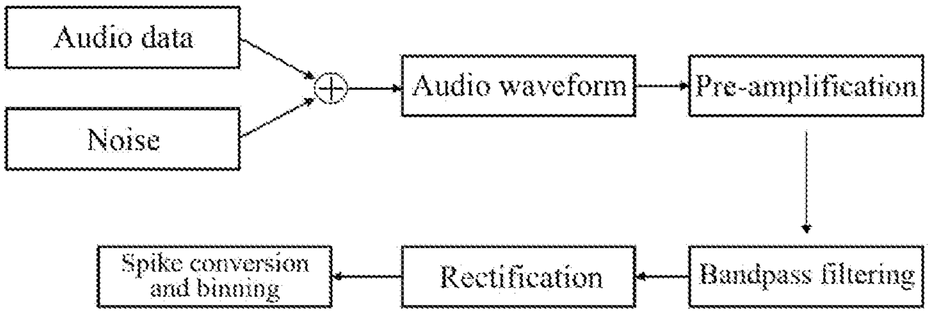
FIG. 10 is a flow chart of a data set signal processing according to an embodiment of the present disclosure.

In order to demonstrate the inventiveness of the present disclosure, we compared the data sets of Aloha, HeySnips and SpeechCommands with other contemporary prior art 4-7. These datasets are the datasets used for ANN training. Before being used for SNN training, the following preprocessing needs to be done. Please refer to FIG. 10. First, noise enhancement is performed. For example, noise can be added to the data set (except HeySnips) through the MUSAN noise data set, and the signal-to-noise ratio is 5 dB. Second, pre-amplification processing is performed. That is, length normalization and/or amplitude normalization is performed. Then, the bandpass filtering is performed. The data set is processed by 2nd order 64 Butterworth bandpass filtering, which is distributed between 100 Hz and 8 k Hz in a Mel-scale. And then, a rectification is performed. A full-wave rectification of the bandpass filtered response is performed. Finally, spike conversion and binning is performed. The rectified output is directly applied to the 64 LIF neurons to generate a second spike train. These spike trains are combined into 10 ms time steps to allow the aforementioned multi-spikes per time step.

Prior art 4: Blouw P, choo X, hunsberger E, et al. Benchmarking keyword spotting efficiency on neuromorphic hardware[C]//Proceedings of the 7th Annual Neuro-inspired Computational Elements Workshop. 2019: 1-8.

Prior art 5: Coucke A, chlieh M, gisselbrecht T, et al. Efficient keyword spotting using dilated convolutions and gating[C]//IASSP 2019-2019 IEEE International Conference on Acoustics, speech and Signal Processing (ICASSP). IEEE, 2019: 6351-6355.

Prior art 6: Cramer B, stradmann Y, schemmel J, et al. The Heidelberg Spiking Data Sets for the Systematic Evaluation of Spiking Neural Networks[J]. IEEE Transactions on Neural Networks and Learning Systems, 2020.

Prior art 7: Perez-Nieves N, leung V C H, dragotti P L, et al. Neural heterogeneity promotes robust learning[J]. bioRxiv, 2021: 2020.12. 18.423468.

On the Aloha dataset, the SNN model in prior art 4 is used as a comparison. Table 1 shows the performance of Wave-Sense on the Aloha dataset. In terms of keyword recognition, Wave-Sense uses nearly 10% of the neural network configuration parameter scale and achieves an average accuracy of 98%. The best test results show that Wave-Sense can achieve 99.5%, which is the same accuracy performance as the ANN model.

TABLE 1

Performance on the Aloha dataset

| Technical solutions | number of neurons | parameter scale | precision |
|---|---|---|---|
| Prior art 4 | 541 | 172800 | 95.8 |
| Wave-Sense | 864 | 18482 | 98.0 ± 1.1 |

On the HeySips clean dataset, we reproduce WaveNet with a recognition accuracy of 99.8%. Since Prior art 5 does not give the recognition accuracy, it is replaced with a false rejection rate of 0.12% FRR and an hourly false early warning FAPH indicator of 0.5. Prior art 5 achieves this performance because of the use of "keyword end tag" and "masking" techniques, if this method and gating are removed, the FRR of this scheme will drop to 0.98.

In the Wave-Sense model, we do not use any gating technique, the kernel size is 2 and there are only 8 layers, and the configuration parameters are only 13042, while our reproduced WaveNet kernel size is 3 and there are 24 layers. The eventually Wave-Sense has an average accuracy of 99.6% over 11 runs, which is only 0.2% lower than our reproduced WaveNet. The accuracy of the best running results is consistent with WaveNet, both 99.8%.

For the SpeechCommands dataset, the accuracy of Wave-Sense is 79.6%±0.1, while other SNNs can only achieve 50+% accuracy. The accuracy of our reproduced WaveNet is 87.6%, while the performance of other ANNs (CNN and LSTM) is not as good as Wave-Sense. The test results of the above datasets can be found in Table 2 for details.

TABLE 2

Performance of different network architectures on three different datasets

| Technical solutions | Data set | Accuracy(%) | Network Architecture |
|---|---|---|---|
| Prior art 5 | HeySnips | FRR0.12 FAPH0.5 | WaveNet |
| Prior art 5 | HeySnips | FRR2.09 FAPH0.5 | LSTM |
| Prior art 5 | HeySnips | FRR2.51 FAPH 0.5 | CNN |
| Our Work | HeySnips | 99.8 FRR0.8 FAPH0.95 | WaveNet |
| Wave-Sense | HeySnips | 99.6 ± 0.1 FRR1.0 FAPH1.34 | SNN |
| Prior art 6 | SpeechCommands (35) | 50.9 ± 1.1 | SNN |
| Prior art 6 | SpeechCommands (35) | 73 ± 0.1 | LSTM |
| Prior art 6 | SpeechCommands (35) | 77.7 ± 0.2 | CNN |
| Prior art 7 | SpeechCommands (35) | 57.3 ± 0.4 | SNN |
| Our Work | SpeechCommands (35) | 87.6 | WaveNet |
| Wave-Sense | SpeechCommands (35) | 79.6 ± 0.1 | SNN |
| Prior art 4 | Aloha | 93.8 | SNN |
| Our Work | Aloha | 99.5 | WaveNet |
| Wave-Sense | Aloha | 98.0 ± 1.1 | SNN |

Compared with WaveNet in ANN, WaveNet needs to store the activations of each layer according to the kernel size and dilation value, namely $N_{buf} \propto (k-1) \cdot d+1$, where $N_{buf}$ is the buffer size, k is the number of layers, and d is the dilation value.

Apparently, Wave-Sense does not need to temporarily store any spikes or activations in the past, i.e. $N_{buf} \propto k+1$, where $N_{buf}$ is the buffer size and k is the number of computing blocks. In other words, Wave-Sense has significant storage usage efficiency than WaveNet.

The choice of time constants and the number of layers is influenced by the total temporal memory required by the task. After choosing the synaptic time constant to grow by a factor of 2, the sum of all synaptic time constants is proportional to the temporal memory $\tau_{task}$. According to the inventor's observation, when the kernel size is 2, $\tau_{task} \approx 2.5\Sigma_i \tau_s$, where i is the count number of each layer of the Wave-Sense network, $\tau_{task}$ is the temporal memory size, and $\tau_s$ is the synaptic time constant.

Although the present disclosure has been described with reference to specific features and embodiments of the present disclosure, various modifications and combinations may be made without departing from the present disclosure. Accordingly, the description and drawings should simply be regarded as descriptions of some embodiments of the present disclosure limited by the claims and are expected to cover any and all modifications, variations, combinations or equivalents falling within the scope of the present disclosure. Thus, although the present disclosure and its advantages have been described in detail, various modifications, substitutions and alterations may be made without departing from the present disclosure limited by the appended claims. Further, the scope of the present disclosure is not intended to be limited to specific embodiments of processes, machines, manufactures, compositions of substances, devices, methods and steps described in the specification.

Those of ordinary skill in the art will be easily understood from the disclosure of the present disclosure, and may perform substantially the same function or substantially the same result as described herein according to the present disclosure or a process, machine, manufacture, material composition, apparatus, method or step developed herein. Accordingly, the scopes of claims are intended to include such a process, machine, manufacture, material composition, device, method or step.

In order to achieve better technical results or for the needs of certain applications, those skilled in the art may make further improvements to the technical solution on the basis of the present disclosure. However, even if the part of the improvement/design is inventive or/and creative, as long as the technical features covered by the claims of the present disclosure are utilized, the technical solution should also fall within the scope of the present disclosure according to the "principle of universal coverage."

Certain technical features defined in the claims may have alternative technical features, or the order of certain technical processes and the order of material organization may be reorganized. After reading the embodiments of the present disclosure, it is easy for those of ordinary skill in the art to think of these alternatives, or change the order of the technical process and the order of material organization, and then use basically the same means, solve the basically same technical problems, and achieve basically the same technical effect. Even if the limitations of the claims clearly define the above means or/and order, but these modifications, changes, replacements, should fall into the scope of the claims in accordance with the "Doctrine of Equivalents".

For the claims define a clear numerical limit, those skilled in the art can generally understand that other reasonable values near the value can also be applied to a specific embodiment. These design solutions that are not detached from the idea of the present disclosure also fall within the scope of the claims.

In conjunction with the various method steps and units described in the embodiments disclosed herein, it can be achieved by electronic hardware, computer software, or in a combination thereof. In order to clearly illustrate the interchangeability of hardware and software, the steps and composition of each embodiment have been described in accordance with their functions in the description. Whether these functions are performed in hardware or software depends on the specific application and design constraints of the technical solution. Those of ordinary skill in the art may use different methods for each particular application to achieve the described functions, but such implementation should not be beyond the scope of the claim of the present disclosure.

What is claimed is:

1. A computer neuromorphic chip, configured to process ambient signals, the neuromorphic chip comprising a plurality of hardware-implemented computing blocks fabricated on the chip, wherein each of the computing blocks comprises a plurality of hardware spiking neuron circuit populations formed on the chip, and each of the computing blocks receives a corresponding input spikes train; wherein at least one of the computing blocks is configured to:

project the input spike train which is weighted by a first weight matrix to a first neuron population through a multi-synapse projection, wherein the multi-synapse projection comprises:

(i) at least two different synaptic time constants, and the two different synaptic time constants are both positive values; or (ii) at least two different synaptic transmission delays; or (iii) at least one positive synaptic time constant and at least one synaptic transmission delay with unequal delay durations; project a spike train outputted by the first neuron population, which is weighted by a second weight matrix, to a second neuron population;

project the spike train outputted by the first neuron population, which is weighted by a third weight matrix, to a third neuron population;

add the input spike train of the computing block and an output spike train of the second neuron population to obtain an output spike train of the computing block, and using the output spike train of the computing block as a corresponding input spike train of a next computing block; and sum spike trains outputted by peer neurons in the third neuron population of the plurality of computing blocks to obtain a first spike train.

2. The computer neomorphic chip of claim 1, wherein the computing block is further configured to: project the first spike train weighted by a fourth weight matrix to a fourth neuron population.

3. The computing neuromorphic chip of claim 2, wherein the computing block is further configured to: project a spike train outputted by the fourth neuron population, which is weighted by a fifth weight matrix, to a fifth neuron population, wherein the fifth neuron population is a non-spiking neuron population.

4. The neuromorphic chip of claim 1, wherein the computing block is further configured to: project a second spike train or an injected current signal, which is weighted by a sixth weight matrix, to a sixth neuron population, wherein a spike train outputted by the sixth neuron population is an input spike train of a first computing block.

5. The neuromorphic chip of claim 4, wherein the sixth neuron population changes a dimension of the second spike train or the injected current signal, so that a dimension of the spike train outputted by the sixth neuron population matches a dimension of the first computing block.

6. The neuromorphic chip of claim 1, wherein the computing block is further configured to: project the first spike train weighted by a fourth weight matrix to a fourth neuron population;

project a spike train outputted by the fourth neuron population, which is weighted by a fifth weight matrix, to a fifth neuron population, wherein the fifth neuron population is a non-spiking neuron population; and project a second spike train or an injected current signal, which is weighted by a sixth weight matrix, to a sixth neuron population, wherein a spike train outputted by the sixth neuron population is an input spike train of a first computing block.

7. The neuromorphic chip of claim 6, wherein the neuromorphic chip further comprises: at least two sets of the second weight matrix and the second neuron population; and/or at least two sets of the third weight matrix and the third neuron population; and/or at least two sets of the fourth weight matrix and the fourth neuron population.

8. The neuromorphic chip of claim 1, wherein the computing block is further configured to: project the spike train outputted by the first neuron population, which is weighted by the second weight matrix, to the second neuron population through a single synapse; and/or project the spike train outputted by the first neuron population, which is weighted by the third weight matrix, to the third second neuron population through a single synapse; and/or project the first spike train, which is weighted by the fourth weight matrix, to the fourth neuron population through a single synapse; and project the spike train outputted by the fourth neuron population weighted by the fifth weight matrix, to the fifth neuron population through a single synapse, wherein the fifth neuron population is a non-spiking neuron population.

9. The neuromorphic chip of claim 4, wherein the second spike train or the injected current signal is obtained after processing the ambient signal collected by a sensor.

10. The neuromorphic chip of claim 9, wherein the ambient signals are one or more of sound, light, physiological, pressure, gas, temperature, and displacement signals.

11. The computing neomorphic chip of claim 4, wherein the second spike train is obtained after the ambient signal is processed by an analog front-end circuit.

12. The neuromorphic chip of claim 4, wherein the injected current signal is obtained after the ambient signal is processed by an analog front-end circuit.

13. The neuromorphic chip of claim 1, wherein the neuromorphic chip is a training device; the neuron population includes a plurality of neurons; when the membrane voltage of a neuron exceeds the threshold, multiple spikes are generated in a simulated time step, and the amplitude of the multiple spikes is determined according to a ratio of the membrane voltage to the threshold.

14. The neuromorphic chip of claim 13, wherein the amplitude of the multiple spikes is equal to a unit amplitude multiplied by a rounded down value of the ratio.

15. The neuromorphic chip of claim 13, wherein a total loss of a spiking neural network is a summation of a first loss and a second loss, and the first loss reflects a difference between an expected output and an actual output of the spiking neural network and the second loss reflects an activity or degree of activity of the neuron.

16. The neuromorphic chip of claim 1, wherein a synaptic projection path is turned on/off by configuring a random access memory (RAM) and/or a register.

17. A neuromorphic chip, configured to process ambient signals, the neuromorphic chip comprising a spiking neural network system, the neuromorphic chip acquiring the ambient signal and transforming the ambient signal into a second spike train or an injected current signal; wherein the spiking neural network comprises a plurality of neuron populations, and at least one neuron population of the plurality of neuron populations is configured to project the input spike train or the injected current signal of the neuron population weighted by a weight matrix to the neuron population through a multi-synapse projection, wherein the multi-synapse projection has at least two different synaptic time constants and the two different synaptic time constants are both positive.

18. A neuromorphic chip configured to process ambient signals, the neuromorphic chip comprising a plurality of hardware-implemented computing blocks fabricated on the chip, each of the computing blocks comprising a plurality of hardware spiking neuron circuit populations formed on the chip, and each of the computing blocks receiving a corresponding input signal; wherein at least one of the computing blocks is configured to: project the input spike train weighted by a first weight matrix to a first neuron population through a multi-synapse projection, wherein the multi-synapse projection comprises:

(i) at least two different synaptic time constants, and the two different synaptic time constants are both positive values; or (ii) at least two different synaptic transmission delays; or (iii) at least one positive synaptic time constant and at least one synaptic transmission delay with unequal delay durations;

project a spike train outputted by the first neuron population, which is weighted by a second weight matrix, to a second neuron population;

project the spike train outputted by the first neuron population, which is weighted by a third weight matrix, to a third neuron population;

add the input spike train of the computing block and an output spike train of the second neuron population to obtain an output spike train of the computing block, and using the output spike train of the computing block as a corresponding input spike train of a next computing block; and sum spike trains outputted by peer neurons in the third neuron population of the plurality of computing blocks to obtain a first signal.

19. The neuromorphic chip according to claim 18, wherein: an activation function of neurons in the neuron population is a linear activation function or a nonlinear activation function.

20. The neuromorphic chip according to claim 18, wherein the neuromorphic chip is a chip.

* * * * *